United States Patent [19]
Gronholz

[11] 3,712,033
[45] Jan. 23, 1973

[54] AIR CLEANER WITH HINGED SIDE WALLS

[75] Inventor: Donald D. Gronholz, Minneapolis, Minn.

[73] Assignee: Donaldson Co. Inc., Minneapolis, Minn.

[22] Filed: June 1, 1971

[21] Appl. No.: 148,489

[52] U.S. Cl. ..................55/493, 55/500, 55/497, 55/502, 55/505, 55/509, 55/511, 55/521, 55/DIG. 31, 210/493
[51] Int. Cl. .............................................B01d 46/52
[58] Field of Search........55/490, 493, 495, 497, 499, 55/500, 501, 502, 505, 506, 507, 509, 511, 521; 210/493

[56] References Cited

UNITED STATES PATENTS

| | | | |
|---|---|---|---|
| 3,142,550 | 7/1964 | Kuehne | 55/495 |
| 3,144,315 | 8/1964 | Honn | 55/500 X |
| 3,376,695 | 4/1968 | Muckley | 55/505 X |

*Primary Examiner*—Dennis E. Talbert, Jr.
*Attorney*—Merchant & Gould

[57] ABSTRACT

A box-like filter housing molded from a plastic material is shown, having a rectangularly shaped pleated filter element and protective screen mounted therein. The housing includes a bottom wall with an aperture, and a pair of opposing side walls each having a hinged upper portion with a lip formed thereon to swing over the adjacent edge of the filter and screen to hold them in the housing. End walls are provided to seal the ends of the filter element and to hold the side walls in position. In one form of the invention, the end walls are hinged to the bottom wall.

11 Claims, 9 Drawing Figures

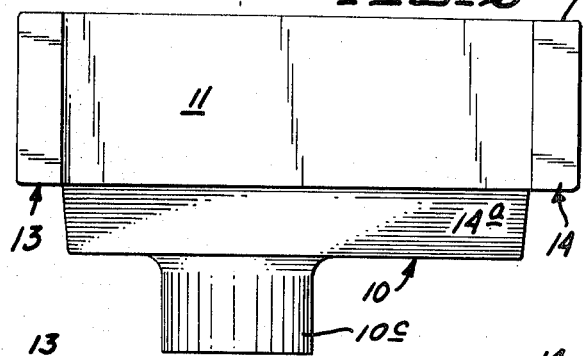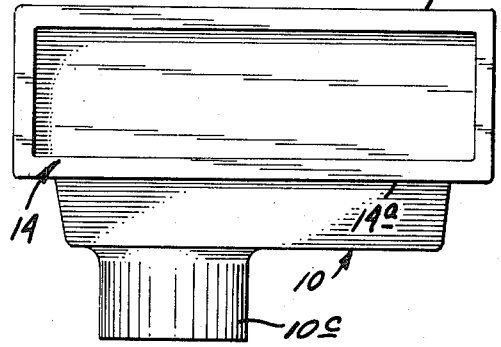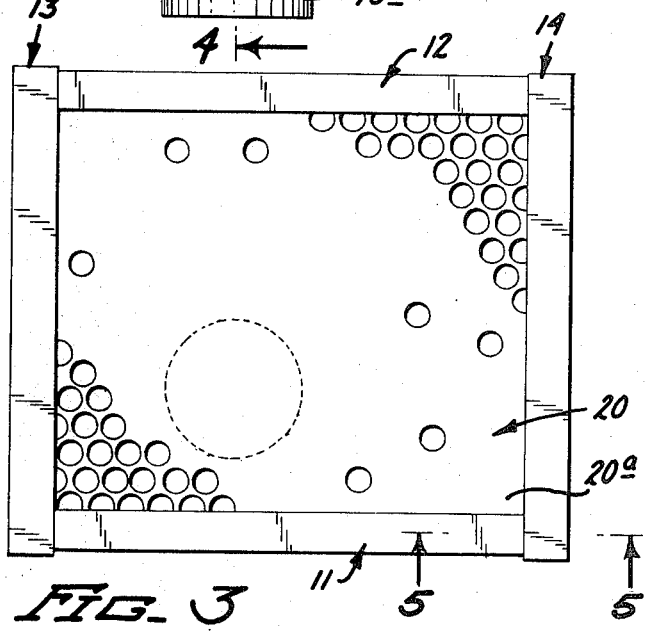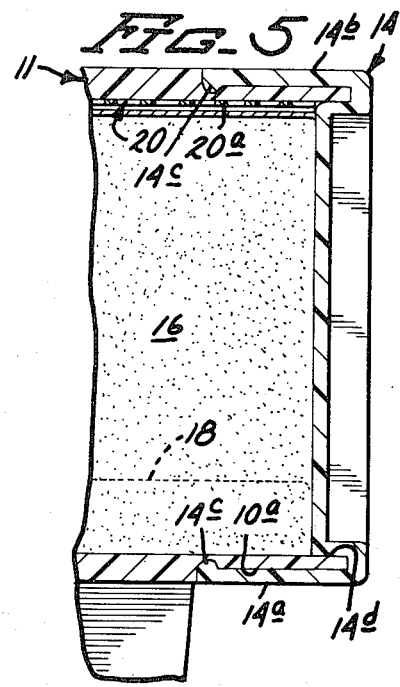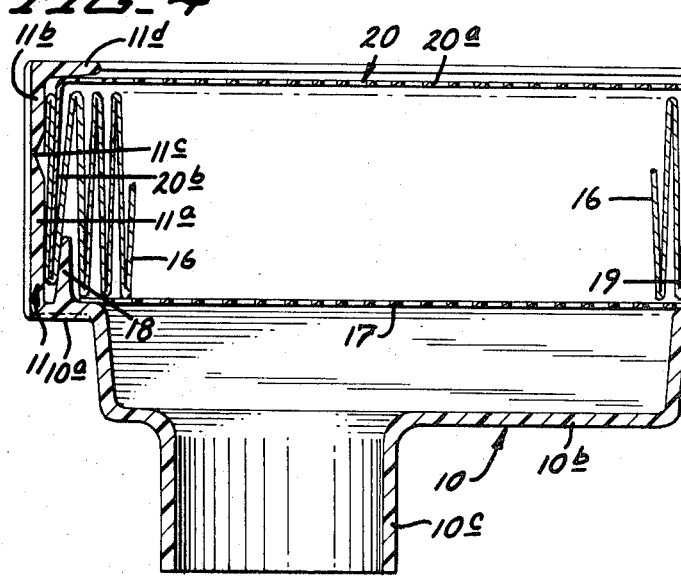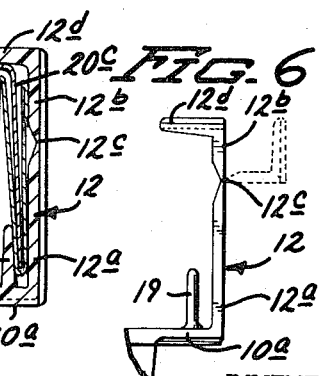
INVENTOR.
DONALD D. GRONHOLZ
BY MERCHANT & GOULD
ATTORNEYS

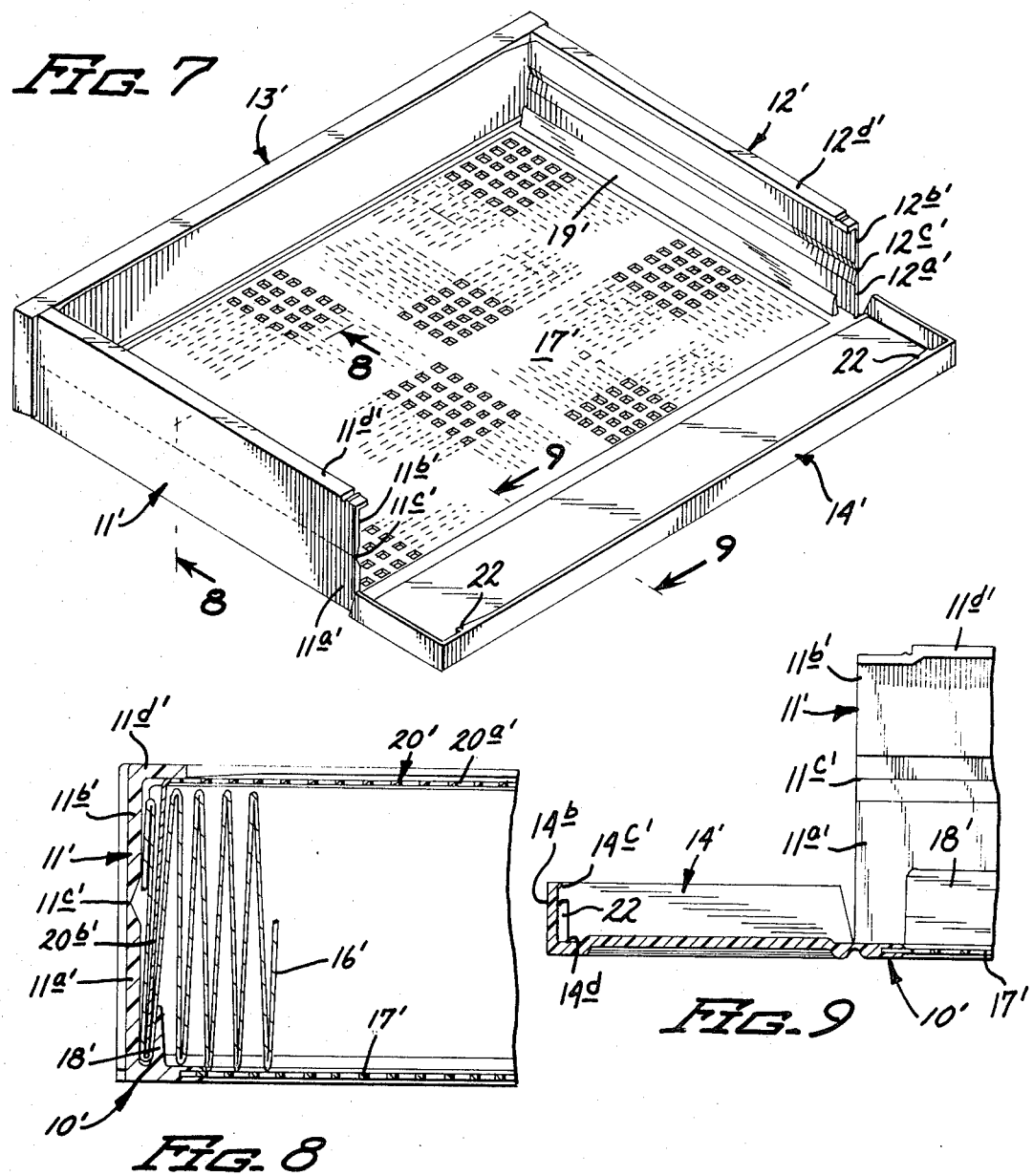

AIR CLEANER WITH HINGED SIDE WALLS

BACKGROUND OF THE INVENTION

1. Field of the Invention

This invention relates generally to fluid filters and more particularly relates to a molded plastic housing for an air cleaner having a pleated filter element.

2. Description of the Prior Art

In many air cleaner applications, it is desirable to utilize a relatively small, inexpensive panel filter. Many manufacturers of small engines are now utilizing disposable units, in which not only the filter element but the entire filter is thrown away when filled with dirt. The housing for such a filter unit must be strong and air tight in order to properly hold the filter element in position over the life of the unit, without permitting unfiltered air to enter the engine. At the same time, to be disposable, the housing must be constructed very inexpensively. Another application for small filters of this kind is in dry copying machines where the filter is used to clean the air leaving the copying machine. This application, and a suitable filter construction therefor, is shown in the Kraft et al. U.S. patent application Ser. No. 711,114, filed Mar. 6, 1968. That application disclosed a small panel filter having an extruded plastic housing with opposed side walls between which extended the pleated filter element. A pair of clips were provided on each side wall to engage a full pleat on each end of the pleated filter element. Separate end covers of the filter assembly were held in place with adhesive or made from a molten thermo-plastic material. With the oppositely directed clips, it was beneficial to extrude these housings rather than mold them, thereby making it difficult to obtain other desirable configurations. In addition, the plastisol end walls did not prove to be entirely satisfactory.

In addition to the structure shown in the Kraft et al patent application, I have employed panel filter housings in which the various walls and surfaces were individually constructed and then joined together by mechanical or adhesive means. With these units, leakage often occurred at corners and joints, permitting dirty air to bypass the filter element. With a multi-piece unit, it was also difficult to provide a flat, leak-proof sealing surface around the air inlet or outlet, depending upon the application.

SUMMARY OF THE INVENTION

The present invention provides a plastic molded housing for a panel filter that is adapted to many applications and sizes. The housing includes a bottom wall with some form of aperture therein. Extending upwardly from the opposite sides of the bottom wall are a pair of side walls with hinged upper portions. Each upper portion includes a lip that extends over the edge of the filter element to hold the filter element between the lip and the bottom wall. The housing is molded from a thermo-plastic material with the upper portions of the two side walls folded outwardly so that the mold can be withdrawn without interference. After the filter element and protective screen and mounted in the housing, between the side walls, the upper portion is swung into the operative position. End walls are then fitted over the ends of the housing and mechanically locked and adhesively secured to the ends of the pleated filter. The end walls seal the ends of the pleated filter and also act to hold the side walls in the operative position. In one form of the invention, the end walls are separate, cap-like members that fit over the ends of the housing and are mechanically locked and adhesively secured thereto. In another form of the invention, the two end walls are hinged to the bottom wall so that after the filter element and hinged portions of the side walls are in position, the two end walls are simply swung upwardly and over the ends of the side walls and filter element. Again, a mechanical lock and adhesive or a plyable sealing material is used to complete the assembly.

In one form of the invention, the bottom wall is formed to provide an air distribution compartment between the filter element and the small air inlet (or outlet). In another form of the invention, with the hinged end walls, the bottom wall provides a flat surface around the bottom aperture that can be sealingly engaged with a gasket to prevent leakage between the filter housing and the duct work to which it is attached.

BRIEF DESCRIPTION OF THE DRAWINGS

FIG. 1 is a view in side elevation of an assembled air cleaner constructed in accordance with the present invention;

FIG. 2 is an end view thereof;

FIG. 3 is a top plan view thereof;

FIG. 4 is an enlarged sectional view as seen from line 4—4 of FIG. 1, portions thereof being broken away;

FIG. 5 is an enlarged fragmentary sectional view as seen from line 5—5 of FIG. 3;

FIG. 6 is an end view of one of the hinged side walls, the hinged upper portion thereof being shown in alternate positions;

FIG. 7 is a view in perspective of a partially assembled housing for another embodiment of the invention;

FIG. 8 is an enlarged fragmentary sectional view as seen from line 8—8 of FIG. 7, with a pleated filter element and metal screen mounted therein; and FIG. 9 is an enlarged fragmentary sectional view as seen from line 9—9 of FIG. 7.

DESCRIPTION OF THE PREFERRED EMBODIMENTS

Referring to the drawings, wherein like reference numerals are used throughout the several views to indicate like elements of the invention, there is disclosed in FIGS. 1–6 one form of my invention. The filter assembly includes a housing having a generally rectangular bottom wall portion 10, a pair of opposed side walls 11 and 12 and a pair of end walls or end caps 13 and 14. As shown in FIG. 4, bottom wall 10 has a planar peripheral portion 10a, an air chamber or plenum-forming portion 10b with an aperture therein defined by air inlet tube 10c.

Each of the side walls includes a first or bottom portion 11a, 12a affixed to the side edge of the bottom wall 10 and extending upwardly, perpendicular thereto. First portions 11a and 12a are of equal size and are parallel to each other. A second portion 11b, 12b is joined to the corresponding first portion by hinge means 11c, 12c. A lip portion 11d, 12d is affixed to the top edge of each corresponding second portion of the side walls. As shown in the drawings, each of the first portions, second portions and lip portions are generally rectangular flat members that extend the full length of the housing.

Mounted within the housing is a substantially rectangularly shaped pleated filter element 16 of gas permeable material. The main body of the filter element 16 is supported by a flat metal screen 17 that rests on peripheral portion 10a above the plenum chamber formed by bottom wall portion 10b. An upstanding wall member 18, 19 is formed on the peripheral bottom wall portion 10a adjacent each of the first portions 11a, 12a to form a slot therebetween into which a side pleat of the filter element 16 extends. Upstanding wall members 18 and 19 extend substantially the full length of the housing.

A second metal screen 20 is also associated with the filter means. Screen 20 includes a main rectangular portion 20a positioned adjacent the tips of the filter pleats opposite screen 17, and also includes a pair of rectangular side legs 20b and 20c each of which extend into a corresponding side pleat and have a bottom edge thereof positioned in the corresponding slot adjacent upstanding wall members 18 and 19. The screens 17 and 20 need not be metal, but may also be constructed from other rigid material such as plastic. In small units, a screen may not be required.

Preferably, the housing for the unit shown in FIGS. 1–6 is molded from a plastic material as a single unit. The hinge means 11c, 12c are simply thin portions in the side walls that permit them to be folded in the manner of a hinge. As shown in FIG. 6, the second portion 12b and lip portion 12d can be swung from a dotted line position in which the second portion 12b is perpendicular to first portion 12a to a full line position in which the two portions are coplanar. The housing is actually molded so that the hinge portion is formed in the dotted line position of FIG. 6, so that the mold can be pulled straight out without interfering with any parts of the housing. To assemble the filter assembly of FIGS. 1–6, metal screen 17 is positioned on peripheral portion 10a between the upstanding wall members 18 and 19. The filter means comprising the filter element 16 and the screen 20 is then assembled and inserted between the side walls 11 and 12 while the hinged upper portions of the side walls are swung outwardly, out of the way. When the filter means is inserted to the position shown in FIG. 4, second portions 11b and 12b can be swung inwardly until the lip portion 11d and 12d extend over an edge of the filter means to hold the filter means in the position shown. Normally, it is not necessary to adhesively secure the side pleats to the side walls 11 and 12 because there is no path for air to leak between the filter means and the side walls if the slots adjacent upstanding wall members 18 and 19 tightly grip the side pleat and side legs.

The next step in assembling the unit is to mount the end caps 13 and 14 over the opposite ends of the unit. End caps 13 and 14 are identical in construction. The configuration of end cap 14 is more clearly shown in FIG. 5. In order to provide smooth upper and lower surfaces on the filter assembly, the outer or bottom surface of peripheral portion 10a and the upper surface of the end of lip portion 12d are recessed to a depth sufficient to fully accommodate the side wall portions 14a and 14b of end cap 14. In addition, the edges of side wall portions 14a and 14b are provided with inwardly extending ridges 14c that snap into corresponding grooves in the recessed portions. To add further rigidity to the unit, the major wall portion of end cap 14 is recessed to form a peripheral groove 14d into which the end of the housing extends. The end of the pleated filter element 16 abuts the raised central portion of the end cap. When the end cap 14 has been inserted on the unit as shown in FIG. 5, the unit is turned on its side an approximately three-sixteenths to five-sixteenths inch of hot melt thermoplastic material is poured into the end cap 14 to adhesively secure it to the end of the filter element and further seal the unit from air passage between the filter element and end cap. The same procedure is then repeated for end cap 13. The filter assembly of FIGS. 1–6 can be used, for example, with a small internal combustion engine. In such an application, the tube 10c would be attached to the air inlet for the engine. This filter assembly could also be used in the application disclosed in the previously identified Kraft et al. application. Instead of using hot melt thermo-plastic material to seal the ends of the pleated filter element, an alternative approach is to place pads of sponge material between the filter ends and the end caps. The sponge material, when tightly squeezed therebetween, forms an effective seal.

Another embodiment of the invention is shown in FIGS. 7–9. In this device, the bottom wall 10' has a rectangular opening and a support screen 17' is molded around its edge into the bottom wall 10'. If desired, the screen could be integrally molded with the bottom wall. This embodiment does not have a plenum chamber. Another major difference is that the end caps 13' and 14' are secured at their bottom edges to bottom wall 10' by hinge means. In this embodiment, the end caps 13' and 14' are molded along with the remainder of the housing, with the hinge means being formed in the same manner previously described for hinge means 11c and 12c. It can be seen from FIG. 7 that if the two end walls or end caps 13' and 14' are molded in the folded-out position, no interference with the mold will occur.

As shown in FIG. 9, the hinge means between end cap 14' and bottom wall 10' is constructed so that the lower surface of bottom wall 10' is a perfectly flat, one piece sealing surface with no seams. This permits a gasket or other sealing means to be applied to the surface around the air flow path so that no air escapes or enters (depending upon the application) between the filter assembly and the duct work on which it is mounted.

Another feature of this structure is that the inner surface of the upper side wall of end caps 13' and 14' are provided with ramp members 22 spaced from the ends of the end caps a distance corresponding to the width of lip portions 11d' and 12d'. The lip portions thus fit between the ramp members 22 and the end walls of the end caps 13' and 14' to prevent movement of the side walls 11' and 12' in either direction. As best shown in FIGS. 7 and 9, the ends of lip portions 11d' and 12d' are each provided with a recess and laterally extending groove into which the upper side walls of end caps 13' and 14', and the corresponding molded ridges 14c' extend. This arrangement provides a flush upper surface to the housing as shown in FIGS. 7 and 8. Again, this upper surface can be used as a sealing or gasket engaging surface.

This filter assembly is put together in the same fashion as that previously described for the first embodiment, except that the end walls 13' and 14' are simply folded up into their proper position against the ends of the filter element and over the ends of the side walls. Again, a hot melt adhesive is used to secure the end caps to the ends of the pleated filter element.

The hinged side walls of the present invention permits the housing to be molded as a single unit or to be molded with separate end caps, but the hinged portion of each side wall acts to securely retain the filter means in the housing after the unit is assembled. The hinged side walls eliminate the need for any seam or mechanical joint between the side walls and the bottom wall of the housing. Further, they make it easier to provide a flat, coplanar bottom surface. The hinged end walls of the second embodiment further reduce the number of mechanical connections and potential air leaks, and again make it easier to provide a flat bottom sealing surface. The present invention thus provides a sturdy, easily molded, inexpensive plastic housing for a panel filter employing a pleated filter element and protective screens.

What is claimed is:

1. A filter assembly comprising:
    a. a housing having two opposed side walls, and bottom wall means joining said side walls, said bottom wall means having an aperture therein;
    b. said side walls each comprising a first portion affixed to said bottom wall means, a second portion joined to said first portion by hinge means, and a lip portion affixed to said second portion;
    c. filter means mounted on said bottom wall means between said side walls; and
    d. said housing having end wall means extending between the ends of said side walls and sealing the ends of said filter means, said end wall means including means for holding said first and second portions of each said side wall in a coplanar relationship adjacent said filter means with said lip portion extending over an edge of said filter means to aid in holding said filter means in said housing.

2. The apparatus of claim 1 wherein said end wall means are connected by hinged means to said bottom wall means.

3. The apparatus of claim 2 wherein said housing is molded as a single unit from a plastic material, said bottom wall means being formed to have a planar surface around said aperture to facilitate the sealing of gasket means thereto.

4. The apparatus of claim 1 wherein said first portions of said side walls are parallel to each other and extend generally perpendicular to said bottom wall means, and wherein said filter means comprises a substantially rectangularly shaped pleated filter element of gas permeable material and a support screen, said screen having a main portion positioned opposite the filter element from said bottom wall means and a pair of side legs each extending into a corresponding side pleat and having an edge thereof positioned adjacent said bottom wall means, said lip portions extending generally perpendicular to corresponding first and second coplanar portions and over said screen above said side legs to aid in holding said filter means in said housing.

5. The apparatus of claim 4 wherein said end wall means are separate end caps that encompass the ends of said side walls, bottom wall means and filter means, and adhesively secured thereto.

6. The apparatus of claim 5 wherein said end caps, side walls and bottom wall means are mechanically interlocked together.

7. The apparatus of claim 4 wherein said end wall means are connected by hinge means to said bottom wall means, and wherein said housing is molded as a single unit from a plastic material.

8. The apparatus of claim 7 wherein mechanical interlocking means are provided between said end wall means and said side walls.

9. The apparatus of claim 4 wherein an upstanding wall member is formed on said bottom wall means adjacent each of said first portions of said side walls to form a slot therebetween into which said side legs and corresponding side pleats of said filter means extend.

10. A filter assembly comprising:
    a. a housing having two opposed side walls, and bottom wall means joining said side walls, said bottom wall means having an aperture therein;
    b. said side walls each having opposite ends and each comprising a first portion connected to said bottom wall means, a second portion joined to said first portion by hinge means, and a lip portion affixed to said second portion;
    c. filter means mounted on said bottom wall means between said side walls; and
    d. said housing having end wall means extending between the ends of said side walls and sealing the ends of said filter means, said end wall means including means for holding each said side wall generally perpendicular to said bottom wall means adjacent said filter means with said lip portion extending over an edge of said filter means to aid in holding said filter means in said housing.

11. A filter assembly comprising:
    a. a housing having two opposed side walls each having opposite ends, and bottom wall means joining said side walls, said bottom wall means having an aperture therein;
    b. said side walls being connected to said bottom wall means by means including hinge means;
    c. each of said side walls having a lip portion affixed thereto;
    d. filter means mounted on said bottom wall means between said side walls; and
    e. said housing having end wall means extending between the ends of said side walls and sealing the ends of said filter means, said end wall means including means for holding said hinged side walls adjacent said filter means with said lip portion extending over an edge of said filter means to aid in holding said filter means in said housing.

* * * * *

Disclaimer 3,712,033.—*Donald D. Gronholz*, Minneapolis, Minn. AIR CLEANER WITH HINGED SIDE WALLS. Patent dated Jan. 23, 1973. Disclaimer filed Apr. 16, 1979, by the assignee, *Donaldson Company, Inc.*

Hereby enters this disclaimer to claims 1, 2, 10 and 11 of said patent.

[*Official Gazette June 19, 1979.*]